(12) United States Patent
Luo et al.

(10) Patent No.: US 9,762,775 B2
(45) Date of Patent: *Sep. 12, 2017

(54) METHOD FOR PRODUCING A BLENDED VIDEO SEQUENCE

(71) Applicant: Kodak Alaris Inc., Rochester, NY (US)

(72) Inventors: Jiebo Luo, Pittsford, NY (US); Thomas Joseph Murray, Cohocton, NY (US); Minwoo Park, Pittsford, NY (US)

(73) Assignee: KODAK ALARIS INC., Rochester, NY (US)

( * ) Notice: Subject to any disclaimer, the term of this patent is extended or adjusted under 35 U.S.C. 154(b) by 672 days.

This patent is subject to a terminal disclaimer.

(21) Appl. No.: 14/190,979

(22) Filed: Feb. 26, 2014

(65) Prior Publication Data

US 2014/0176803 A1 Jun. 26, 2014

Related U.S. Application Data

(63) Continuation of application No. 12/971,017, filed on Dec. 17, 2010, now Pat. No. 8,692,940.

(51) Int. Cl.
| | |
|---|---|
| *H04N 9/64* | (2006.01) |
| *H04N 5/14* | (2006.01) |
| *G06T 11/00* | (2006.01) |
| *G11B 27/034* | (2006.01) |
| *G11B 27/28* | (2006.01) |

(52) U.S. Cl.
CPC .............. *H04N 5/14* (2013.01); *G06T 11/00* (2013.01); *G11B 27/034* (2013.01); *G11B 27/28* (2013.01)

(58) Field of Classification Search
CPC ....... G06T 11/00; G11B 27/034; G11B 27/28; H04N 5/14
See application file for complete search history.

(56) References Cited

U.S. PATENT DOCUMENTS

| | | | | |
|---|---|---|---|---|
| 7,302,113 | B2 * | 11/2007 | Pilu .................... | G06K 9/00221 345/629 |
| 8,553,037 | B2 * | 10/2013 | Smith ..................... | G06T 13/40 345/473 |
| 8,649,660 | B2 * | 2/2014 | Bonarrigo ............ | G11B 27/034 348/49 |

* cited by examiner

Primary Examiner — Nhon Diep
(74) Attorney, Agent, or Firm — Hogan Lovells US LLP

(57) ABSTRACT

A method for producing a blended video sequence that combines a still image and a video image sequence comprising: designating a first face in the still image, designating a second face in the video image sequence; detecting a series of video frames in the video image sequence containing the second face; identifying a video frame in the detected series of video frames suitable for transitioning from the first face into the second face; using a data processor to automatically produce a transition image sequence where the first face transitions into the second face, and a first background transitions into a second background; and producing the blended video sequence by concatenating the transition image sequence, and a plurality of video frames from the video image sequence starting from the identified video frame.

12 Claims, 8 Drawing Sheets

METHOD FOR PRODUCING A BLENDED VIDEO SEQUENCE

CROSS-REFERENCES TO RELATED APPLICATIONS

This application is a continuation of and claims priority to U.S. application Ser. No. 12/971,017, filed Dec. 17, 2010, which is hereby incorporated by reference in its entirety.

FIELD OF THE INVENTION

The present invention generally relates to digital image and video processing, and particularly to a method for blending a still photo with a related video.

BACKGROUND OF THE INVENTION

In recent years, the popularity of digital cameras has led to a flourish of personal digital images. For example, Kodak Gallery, Flickr, Facebook, and Picasa Web Album host millions of new personal images uploaded every month. With most digital cameras capable of capturing video clips, a typical user collection may contain both digital still images and digital video images.

Photo slideshows with music have been very popular for sharing memories. The photos can be panned and zoomed, with special effects applied to present a more pleasing and meaningful experience. There are many applications that will create slideshows automatically from a digital image collection containing still and video images (e.g., Muvee). With such applications, a user simply picks the digital media assets (i.e., still images, videos, and music) that he/she wants to include and the slideshow application applies effects that match a theme that the user selected. There is a myriad of effects that can be utilized when transitioning from one image to another image or from a still image to a video. Often the transition from still images to video (and from video to still images) is abrupt and interrupts the flow of the presentation. Conventional transitions introduce a perceived "break" in the presentation by displaying a still image and then playing the video with very little blending of the two. This problem is not well addressed even with fade-in effects.

A fast-emerging trend in digital photography and social network is face tagging. The availability face-tagged photos can help establish correspondence between media streams of photos and videos captured at different times and locations. As a result, many web and desktop computer applications have started to automate face tagging and grouping of the individuals in a photo collection. For example, Picasa Face Movie uses the faces to transition between still photos of the same person by aligning the faces that have been located and tagged in the still photos such that the still photos are shown with the person's faces at a fixed size and location across all the still photos.

U.S. Pat. No. 7,302,113 to Pilu et al., entitled "Displaying digital images," discloses a method of displaying digital images that includes the steps of determining an extent of similarity between a first image part and a second image part, determining a transition type, displaying the first image part and transitioning to displaying the second image part using a determined transition type, the second image part being selected at least partly based on a determined extent of similarity between the first image part and the second image part, in which the viewpoint of an image part is moved during the transition. The transition type is determined from one or more of a dissolve, a wipe, a blind, and a random dissolve.

Morphing is a special image processing technique that creates a smooth, controlled transformation from one image into another. The morphing effect is widely used for various tasks ranging from generation of fancy special effects, smoothing transitions between video frames to funny warping of faces. Other applications of morphing include mixing parent's images to predict what their child will look like, or recreating and image of a past hero from images of his descendants. A classic example of a morphing transformation is shown in the well-known "Black or White" video clip by Michael Jackson, where the faces of different people change from one into another.

Stoik MorphMan is a commercial software product with video-to-video morphing features, performed in a sequence of steps that involve substantial manual user interaction: 1) import movie clips as Source and Target for morphing project, 2) use a sequence browser to scroll sequence of morphs between corresponding frames of input clips, 3) tune source and target clips to choose interval for morphing, 4) set key markers and key frames for manual adjustment of morphing transition in intermediate frames of the sequence, 5) apply a propagate function which uses a motion estimation algorithm to automatically place markers around moving objects, and 6) use a canvas layer that allows simple video compositing directly. While MorphMan is accessible even for users who are not professional video engineers, for example, parents who make "kindergarten-to-college" video transition from their kid's photos, it still requires manual intervention by an operator to guide the morphing process.

In order to create a satisfying user experience, there is a need to produce a smooth and pleasing transition between still photos and video automatically and in particular when people are present in both the still photo and the video.

SUMMARY OF THE INVENTION

The present invention represents a method for producing a blended video sequence that combines a still image and a video image sequence including a plurality of video frames, comprising:
  a) designating a first face in the still image,
  b) designating a remaining portion of the still image excluding the first face to be a first background;
  c) designating a second face in the video image sequence;
  d) using a data processor to automatically detect a series of video frames in the video image sequence containing the second face;
  e) using a data processor to automatically identify a video frame in the detected series of video frames suitable for transitioning from the first face into the second face;
  f) designating a remaining portion of the identified video frame excluding the second face to be a second background;
  g) using a data processor to automatically produce a transition image sequence where the first face transitions into the second face, and the first background transitions into the second background;
  h) producing the blended video sequence by concatenating:
    a plurality of video frames formed from the still image;
    the transition image sequence; and
    a plurality of video frames from the video image sequence starting from the identified video frame; and i) storing the blended video sequence in a processor accessible memory.

Features and advantages of the present invention include an effective way of automatically producing a slideshow or movie by blending a still image to a video, or conversely a video to a still image, using detected faces of the same subject or different subjects.

Several problems are solved by the present invention that are not addressed by previous works. First, previous works do not teach an automated method for selecting a frame in a video image sequence that would be a good candidate for a transition. It is tedious and time consuming for a user to manually browse the video and then select a frame of good quality, having desirable attributes for transitioning from a still image into the video image sequence (e.g., no one is talking, the action is at a lull, etc.). Second, the present invention uses morphing a morphing algorithm to create a smoother transition from a still image to a selected frame in the video image sequence.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
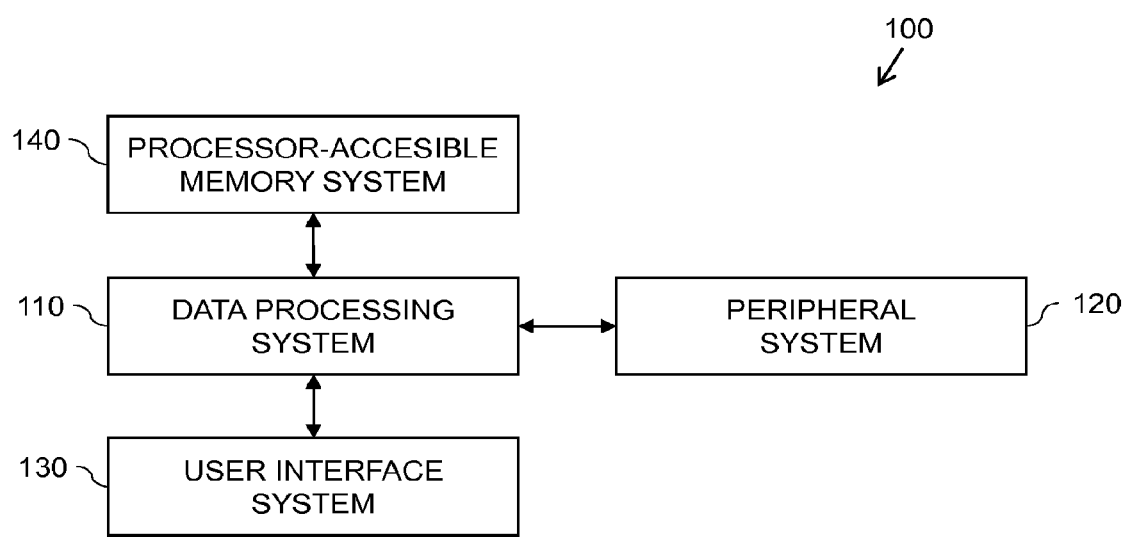
FIG. 1 is a high-level diagram showing the components of a system for producing a blended video sequence according to an embodiment of the present invention.

FIG. 1 is a high-level diagram that illustrates the components of a system 100 for collaborative photo collection and sharing, according to an embodiment of the present invention. The system 100 includes a data processing system 110, a peripheral system 120, a user interface system 130, and a processor-accessible memory system 140. The processor-accessible memory system 140, the peripheral system 120, and the user interface system 130 are communicatively connected to the data processing system 110.

Figure 3:
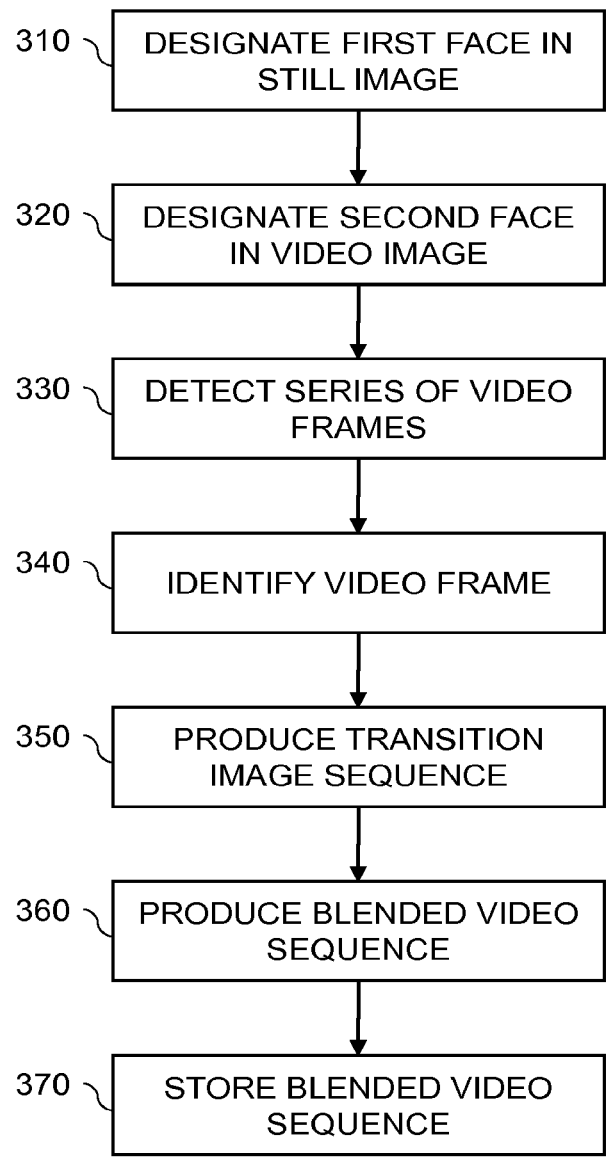
FIG. 3 is a flow chart of a method for producing a blended video sequence according to an embodiment of the present invention.

The data processing system 110 includes one or more data processing devices that implement the processes of the various embodiments of the present invention, including the example process of FIG. 3. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device or component thereof for processing data, managing data, or handling data, whether implemented with electrical, magnetic, optical, biological components, or otherwise.

The processor-accessible memory system 140 includes one or more processor-accessible memories configured to store information, including the information needed to execute the processes of the various embodiments of the present invention. The processor-accessible memory system 140 can be a distributed processor-accessible memory system including multiple processor-accessible memories communicatively connected to the data processing system 110 via a plurality of computers or devices. On the other hand, the processor-accessible memory system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. Further, the phrase "communicatively connected" is intended to include a connection between devices or programs within a single data processor, a connection between devices or programs located in different data processors, and a connection between devices not located in data processors at all. In this regard, although the processor-accessible memory system 140 is shown separately from the data processing system 110, one skilled in the art will appreciate that the processor-accessible memory system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital images to the data processing system 110. For example, the peripheral system 120 can include digital video cameras, cellular phones, regular digital cameras, or other data processors. The data processing system 110, upon receipt of digital content records from a device in the peripheral system 120, can store such digital content records in the processor-accessible memory system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the processor-accessible memory system 140 even though the user interface system 130 and the processor-accessible memory system 140 are shown separately in FIG. 1.

The present invention represents an automatic system using the above mentioned processor to address the problems of blending a still photo and a video in a slideshow, and in particular the problem of automatically creating a smooth and pleasing transition from a still image to a video image.

Morphing from one face to another is common practice and many tools have been developed to aid the user in creating the morphing effect (e.g., the FantaMorph application available from Abrosoft). Transforming the starting face and the ending face to the same size and orientation produces superior quality face morphs. Some tools automatically find corresponding facial feature points in a pair of still images in order to properly align the images, but the user must verify the feature points before the morphing operation begins. The morph processing is fairly compute intensive so the user is forced to wait several minutes (if they are using high resolution images) before they can view the morph.

The present invention automatically aligns the facial feature points and considers head-motion, head-size, and head-orientation to create a much more pleasing effect. The user does not have to spend time selecting the still photo or the video frame, and does not have to spend time resizing and aligning the starting face with the target face. When creating this transition effect with manual tools the user first must create the "face morph video" and then concatenate it with the video at the precise frame where the target face was selected. All of these steps take time and require the user to create a video file to playback. Using the present invention, the transition occurs in real-time so there is no waiting for the morphing step and no need to create a video file before playback.

For a more pleasing transition, the present invention uses facial analysis to determine pose, motion and expression for a video frame, and pose, location, and expression for a still image. In some instances, the transition effect can be "seamless" from the still image to the video frame if the face motion generated for transiting the still photo matches the face motion in the video at the time. Furthermore, if the mouth position and facial expression are similar (e.g. mouth open versus mouth closed, smile versus frown) between the starting face in the still photos and the target face in the video frame, the viewing experience is even more pleasing.

Figure 2:
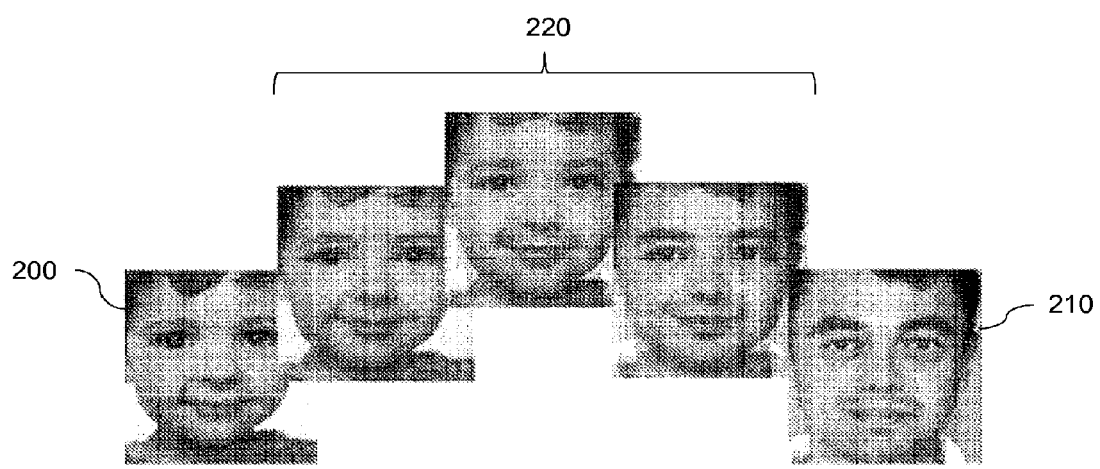
FIG. 2 is a pictorial illustration of a face morphing sequence.

Referring to FIG. 2, there is shown a pictorial illustration of a morphing sequence from a source face image 200 (child) to a target face image 210 (adult). The intermediate face images 220 are created using a morphing algorithm to fill in the gap between the source face image 200 and the target face image 210 such that when played in succession (e.g., as a video sequence), the source face image 200 smoothly and gradually changes into the target face image 210. For an applicable morphing algorithm, see the article by Martin Bichsel entitled "Automatic interpolation and recognition of face images by morphing" (Proc. Second International Conference on Automatic Face and Gesture Recognition, pp. 128-135, 1996). Any face morphing algorithm known in the art can also be used.

The present invention will now be described with reference to FIG. 3, which shows a flow chart for performing the steps of the present invention. In algorithmic steps, the operations of the present invention are implemented in the following steps by the data processing system 110 in FIG. 1. The inputs to the method of this process are a still image and a video image sequence, for which it is desired to create a blended video sequence. A designate first face in still image step 310 is used to designate a first face in the input still image. Preferably, the first face is designated by identifying a location and boundary of a face of interest. In some embodiments, the designate first face in still image step 310 is automatically accomplished by using a face detection algorithm. In the case where one face is detected, this face is readily designated as the first face. When there are multiple detected faces, a user interaction may be required to designate the first face. Otherwise, the first face maybe automatically designated by its prominent size, position and other characteristics.

In other embodiments, a user interface is provided for enabling a user to manually designate the first face in the input still image using a face selection means. For example, the face selection means can allow the user to "click" on a face in the still image, or to draw a box around a face. In some embodiments, a face recognition algorithm can be trained to identify a set of named individuals in a collection of images based on their facial characteristics. In this case, the user interface can include a name designation means to enable the user to designate the name of a person, and the face recognition algorithm can be used to locate a face corresponding to the designated person in the input still image. Also in the designate first face in still image step 310, a first background region is designated corresponding to the remaining portion of the still image excluding the designated first face.

Next, a designate second face in video image step 320 is performed to designate a second face in the related input video image sequence. This second face can be either a face of the same person as the designated first face, or can be a face of a different person. The second face can be designated similarly to the first face, using either an automatic face detection or face recognition algorithm, or using a manual user interface enabling a user to designate a face in a particular video frame or to designate the name of a particular person for which a face recognition algorithm should search. In some embodiments, the second face can be automatically identified by using a face recognition algorithm to identify a face in the input video image sequence corresponding to the same person as the designated first face from the still image.

Next, a detect series of video frames step 330 is performed to detect a series of video frames containing the designated second face. In a preferred embodiment, this step is performed by using an automatic face recognition algorithm to automatically detect video frames from the video image sequence that contain the designated second face. In some cases, the detected video frames are restricted to video frames that are contiguous to an initial video frame in which the second face was first detected. In other embodiments, all video frames containing the second face are detected, whether they are contiguous or not. In other embodiments, video frames containing the second face can be identified by a face tracking algorithm to track the location of the second face from frame-to-frame in the video image sequence starting from the position of the designated second face in an initial video frame. Face recognition and face detection algorithms that can be used to perform the above steps are well known in the art and are available as commercial software as well.

Next, an identify video frame step 340 is performed to automatically identify a video frame (or a sequence of video frames) suitable for transitioning from the first face into the second face. Generally, it will be desirable that a video frame be selected where the location, pose, size and facial expression of the second face closely matches the designated first face, and wherein the second face has a low level of motion and a high level of facial image quality. In a preferred embodiment, the suitability is measured by analyzing a series of evaluation criteria. The evaluation criteria can include various criteria such as a face size criterion, a face position criterion, a pose similarity criterion, a facial image quality criterion, a facial expression criterion, or a facial motion criterion.

Methods for forming such evaluation criteria are well-known in the art. A face size criterion can be determined by evaluating the difference between the size of the first and second faces, or by evaluating whether the second face falls within a desirable size range. A face position criterion can be determined by evaluating the difference between the relative position of the first and second faces within their respective frames, or by evaluating whether the second face falls within a desirable position range. A pose similarity criterion can be determined by evaluating the difference between the pose of the first and second faces (e.g., directions that the faces are facing). A facial image quality criterion can be determined by evaluating various image quality attributes associated with the second face. Examples of relevant image quality attributes would include the image sharpness of the facial region and the spatial image noise (i.e., granularity) in the facial region. A facial expression criterion can be determined by evaluating the difference between the facial expressions of the first and second faces, or by evaluating the desirability of the facial expression for second face (e.g., by evaluating whether the second face is smiling and whether the eyes are open). A facial motion criterion can be determined by evaluating the motion of the second face between the frames of the video image sequence. (Video frames where the facial motion is lower will generally be more desirable than video frames where the face is moving rapidly.) It will generally also be desirable to select a video frame which does not correspond to a time when the second face (or some other person in the video frame) is speaking.

After the video frame is identified, a portion of the identified video frame including the designated second face is designated as a second face region. A second background region is also designated corresponding to the remaining portion of the identified video excluding the designated second face.

Next, a produce transition image sequence step 350 is performed to produce a transition image sequence where the first face transitions into the second face and the first background transitions into the second background. In a preferred embodiment, the transition image sequence includes a still image transition image sequence followed by a morphed image sequence. The still image transition sequence is formed by progressively applying one or more image adjustments to the still image, such that the first face in the adjusted image more closely matches the second face in the identified video frame. In some embodiments, the image adjustments include translating, zooming or rotating the still image to improve a geometrical match between the first face and the second face in the identified video frame. For example, the still image can be zoomed and panned in order to align the first face with the second face. The image adjustments can also include applying a color transformation to the still image to improve a color appearance match between the first face and the second face in the identified video frame. For example, the color balance, the image brightness, the image contrast and the image color saturation can be adjusted to produce a better match between the first face in the adjusted still image and the second face.

The process of producing the morphed image sequence includes using a face morphing algorithm to apply a morphing transformation to transition from the first face to the second face, where the first face in the still image as the source face, and the second face in the identified video frame as the target face. Facial morphing algorithms for producing morphing transformations are well-known in the art. Generally, facial morphing algorithms are controlled by identifying a set of corresponding facial feature points in the first and second faces. Preferably, the facial feature points are identified using an automatic analysis algorithm, although in some embodiments they can be manually user specified. In the scenario of blending from the still image to the video image sequence, the first face is used as the source face 200 (FIG. 2) and the second face is the target face 210 (FIG. 2) in the process of determining a blended image sequence. In the scenario of blending from the video image sequence to the still image, the roles would be reversed.

In a preferred embodiment, the first background transitions into the second background simultaneously with the first face being transitioned into the second face. In other embodiments, the background can be transitioned before or after the face is transitioned, or the transitions can be partially overlapping in time. In some embodiments, the first background can be cross-dissolved into the second background during the transition image sequence. In this case, the first background is gradually faded out, while the second background is gradually faded in. In other embodiments, the first background can be morphed into the second background during the transition image sequence using a morphing algorithm analogous to the facial morphing algorithm described earlier.

Note that for the case of transitioning from the video image sequence to the still image, the above process is reversed such that the still image transition image sequence starts from a transformed version of the still image which matches the geometry and color appearance of the second face and ends with the original still image. In this scenario, the selection of the video frame at which the transition to the still photo should be made can be influenced by other factors, for example, it is desirable to wait until an action or speech is concluded.

After the transition image sequence has been formed, a produce blended video sequence step 360 produces the final blended video sequence. For the case where the blended video sequence transitions from the still image to the video image sequence, the blended video sequence is formed by concatenating a plurality of video frames formed from the input still image, the transition image sequence, and a plurality of video frames from the video image sequence starting from the identified video frame. In some cases, the plurality of video frames from the video image sequence can include all of the video frames between the identified video frame and the end of the video image sequence. In other cases, they can include only a portion of the remaining video frames.

For the case where the blended video sequence transitions from the video image sequence to the still image, the blended video sequence is formed by concatenating a plurality of video frames from the video image sequence ending with the identified video frame, the transition image sequence, and a plurality of video frames formed from the input still image.

Figure 4:
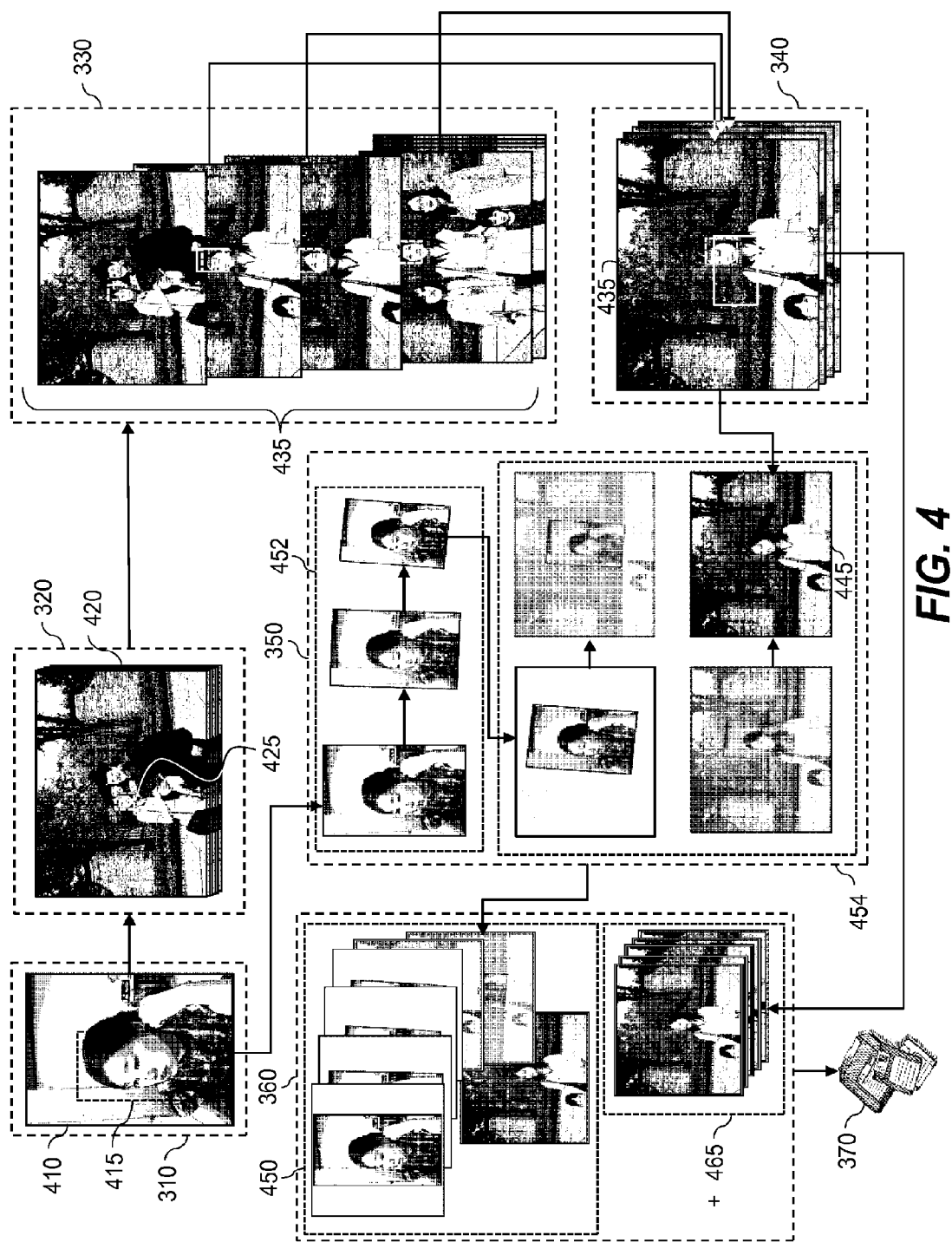
FIG. 4 is a pictorial illustration of a method for producing a blended video sequence using the method shown in FIG. 3.

Finally, a store blended video sequence step 370 is performed to store the blended video sequence in the processor-accessible memory system 140 of the data processing system 110 in FIG. 1. The blended video sequence can be stored using any video image storage format known in the art. Other information can also be stored, such as metadata providing an indication of the identity of designated faces. Furthermore, the stored blended video sequence can also be displayed on a display device or can be transmitted over communication networks. Images from the stored blended video sequence can also be printed, for example as a series of thumbnail images on a reflection print, or onto movie film as frames of a movie. The operations described in FIG. 3 are pictorially illustrated in FIG. 4. Note that each part in FIG. 4 is a pictorial illustration of the corresponding step in FIG. 3. The designate first face in still image step 310 designates a first face 415 in an input still image 410. The designate second face in video image step 320 designates a second face 425 in a video image sequence 420. The detect series of video frames step 330 detects a series of video frames 435 including the second face 425. The identify video frame step 340 analyzes the series of video frames 435 to select an identified video frame 445. The produce transition image sequence step 350 produces a transition image sequence 450. The transition image sequence 450 includes a still image transition image sequence 452 produced by progressively applying geometrical and color appearance adjustments to the still image 410, together with a morphed image sequence 454 where the first face 415 transitions to the second face 425 and the background in the first image 410 transitions to the background in the video image sequence 420. The produce blended video sequence step 360 produces a blended video sequence including the transition image sequence 420 and a plurality of video frames from video image sequence 465. The store blended video sequence step 370 stores the blended video sequence in a processor-accessible memory.

Further details about the main steps 330-350 of the present invention are described in the following. The following image or visual features and algorithms are used in a preferred embodiment of the present invention due to their simplicity and effectiveness:

Square root normalized color histogram. This feature is an important cue for consumer photos because it captures the global distribution of colors in an image. This feature is fast and also fits a linear kernel well. This feature is well known in the art and can be used as an element of the detect series of video frames step 330.

Mean-shift clustering. Mean-shift clustering represents a general non-parametric mode finding/clustering procedure. In contrast to the classic K-means clustering approach, there are no embedded assumptions on the shape of the distribution nor the number of modes/clusters. Details can be found in Y. Cheng, "Mean shift, mode seeking, and clustering," IEEE Transactions on Pattern Analysis and Machine Intelligence, Vol. 17, pp. 790-799 (1995). This feature can be used as an element of the detect series of video frames step 330.

Camshift. Camshift stands for "Continuously Adaptive Mean Shift." This is the basis for the face-tracking algorithm in the Intel OpenCV algorithm library. It combines the basic Mean Shift algorithm with an adaptive region-sizing step. Details can be found in G. R. Bradski, "Computer vision face tracking for use in a perceptual user interface," Intel Technology Journal, (1998). This algorithm can be used as an element of the detect series of video frames step 330.

Regularized TPS. TPS stands for "Thin-Plate Spline" transform. The computation of TPS is simple and efficient to perform non-rigid transformation. Details can be found in Gianluca Donato and Serge Belongie, "Approximate thin plate spline mappings," Proceedings of European conference on Computer Vision (2002). This algorithm can be used as an element of the produce transition image sequence step 350.

RANSAC based estimation of image transformation. RANSAC stands for "Random Sample Consensus." The details can be found in Martin A. Fischler and Robert C. Bolles, "Random sample consensus: a paradigm for model fitting with applications to image analysis and automated cartography," Comm of the ACM, Vol. 24, pp. 381-395 (1981), and Richard Hartley and Andrew Zisserman, "Multiple view geometry in computer vision" Cambridge University Press, second edition (2003). This algorithm can be used as an element of the produce transition image sequence step 350.

The detect series of video frames step 330 in FIG. 3 is performed to detect a series of video frames in the video image sequence containing the second face. This objective can be achieved by several methods. A first method visually tracks the second face forward and backward in time, starting from an initial frame that contains the designated second face. To accomplish the visual tracking operation, the square root normalized color histogram of the face and camshift tracking algorithm are used in an embodiment of the present invention. However the present invention is not restricted to a specific face tracking method. Any of the existing visual tracking algorithms can be used.

A second method for performing the detect series of video frames step 330 uses a face recognition algorithm. In one embodiment of the present invention, a clustering based simple recognition algorithm is used. First, all the faces in the image sequence in a video are detected. Then mean-shift clustering of the faces is performed using a color histogram. All the faces within a cluster that contains the designated second face are included in the series of video frames. To achieve this goal, any face recognition algorithm known in the art can be used.

Figure 5:
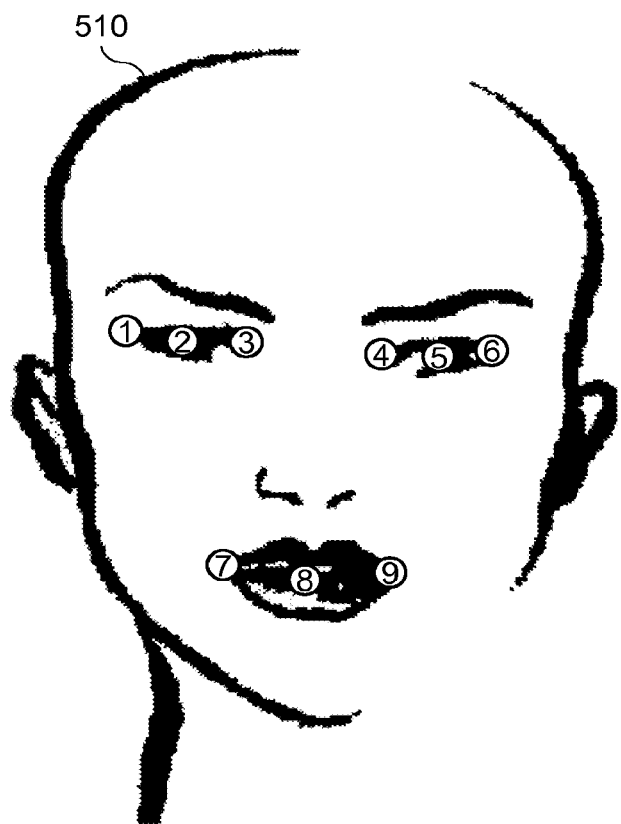
FIG. 5 is a pictorial illustration of nine facial feature points.

The identify video frame step 340 in FIG. 3 is performed to identify a video frame in the detected series of video frames (the output of the detect series of video frames step 330) suitable for transitioning from the first face into the second face. FIG. 5 illustrates a set of nine facial features $p_i=[x_i\ y_i]^T$ for a face 510, where i=1-9, and $[x_i\ y_i]$ are the x- and y-coordinates for the $i^{th}$ facial feature, that can be detected by a facial feature detection algorithm as part of the process of accessing the suitability of a video frame for transitioning according to an embodiment of the present invention. Facial feature detection algorithms for detecting such facial features are well-known in the art. Any such method can be used in accordance with the present invention. These nine facial features $p_i$ are used to evaluate face size, orientation, pose, and facial expression. They correspond to corners and centers of the left and right eyes, and the mouth. For more details on facial feature detection, see Cootes, Taylor, Cooper and Graham, "Active shape models—their training and application," Computer Vision and Image Understanding Vol. 61, pp. 38-59 (1995).

A size similarity measure is used to access the size similarity of a pair of faces including face k and face l. One such size similarity measure is given by:

$$S_s(k, l) = \frac{\min(S^{(k)}, S^{(l)})}{\max(S^{(k)}, S^{(l)})} \quad (1)$$

where $S^{(k)}=\|p_1^{(k)}-p_6^{(k)}\|\times\|p_8^{(k)}-0.5\ p_1^{(k)}-0.5\ p_6^{(k)}\|$. In this expression $\|p_1^{(k)}-p_6^{(k)}\|$ is the distance between the left corner of the left eye and the right corner of the right eye, and $\|p_8^{(k)}-0.5\ p_1^{(k)}-0.5\ p_6^{(k)}\|$ is the distance between the centers of the two eyes and the center of the mouth. If $S_s(k,l)$ is closer to 1.0, the faces k and l are more similar in terms of size.

An orientation similarity measure is used to access the orientation similarity of a pair of faces including the face k and face l. One such orientation similarity measure is given by:

$$S_o(k, l) = 0.5\left(\frac{O^{(k)T}O^{(l)}}{\|O^{(k)}\|\|O^{(l)}\|} + 1\right) \quad (2)$$

where $O^{(k)}=0.5p_1^{(k)}+0.5p_6^{(k)}-p_8^{(k)}$ is a vector starting from the center of mouth to the centers of the both eyes. If $S_o(k,l)$ is closer to 1.0, the faces k and l are more similar in terms of orientation.

A pose similarity measure is used to access the pose similarity of a pair of faces including the face k and face l. One such pose similarity measure is given by:

$$S_p(k, l) = \left\|\begin{bmatrix} P^{(k)} > T \\ P^{(k)} < 1/T \end{bmatrix} - \begin{bmatrix} P^{(l)} > T \\ P^{(l)} < 1/T \end{bmatrix}\right\| \quad (3)$$

where: $P^{(k)}=\|p_7^{(k)}-p_8^{(k)}\|/\|p_9^{(k)}-p_8^{(k)}\|$, ">" is a logical "greater than" operator, and T is a constant (nominally, T=1.2). In this equation $\|p_7^{(k)}-p_8^{(k)}\|$ is the distance between the center of mouth and the left corner of the mouth, and $\|p_9^{(k)}-p_8^{(k)}\|$ is the distance between the center of mouth and the right corner of the mouth. Therefore, if $\|p_7^{(k)}-p_8^{(k)}\|$ and $\|p_9^{(k)}-p_8^{(k)}\|$ are similar, then the face is a frontal face. A lower value of $S_p(k,l)$ means that the faces k and l are more similar in terms of pose. Perfect frontal view produces a $P^{(k)}$ value of 1.0, a face looking left produces $P^{(k)}$ value less than 1.0, and a face looking right produces $P^{(k)}$ value greater than 1.0. However to account for imperfect detection of facial features and variations of facial expressions a threshold of T=1.2 can be used in an embodiment of the present invention. Therefore, if the faces k and l are looking in the same direction, $S_p$ produces 0; if one face is frontal and the other face is either looking left or right then $S_p$ produces 1.0; and if two faces are looking in different directions then $S_p$ produces $2^{1/2}$. Using these scores, similarity between the first face and the second face can be evaluated.

In one embodiment of the present invention, the identify video frame step 340 selects the first video frame that meets the following criteria is selected: the frame should contain the second face, $S_s$ should be larger than 0.25, and $O^{(k)}$ should be larger than 0.6. In other embodiments, the pose similarity score $S_p(k,l)$, as well as an evaluation of face location, facial expression and image quality can also be factored in the selection of the video frame to which the still photo transitions.

Figure 6:
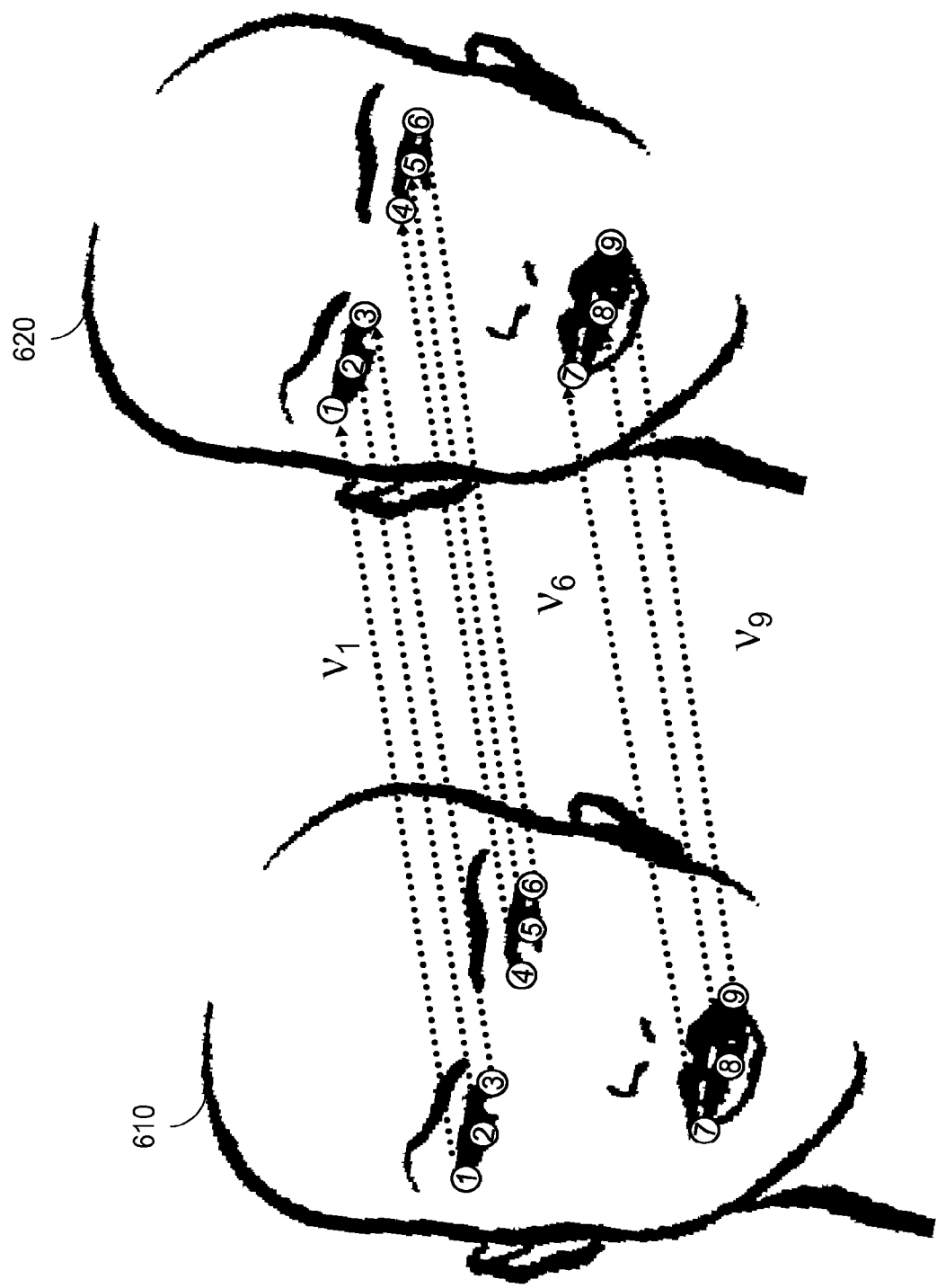
FIG. 6 is a pictorial illustration of nine vectors $v_i$ when the pose similarity score $S_p(k,l)$ is less than or equal to 1.

The produce transition image sequence step 350 in FIG. 3 is performed to produce a transition image sequence where the first face transitions into the second face, and the first background transitions into the second background. The transition image sequence is divided into two stages, where the first stage only involves rigid transformation of the still image and the second stage involves non-rigid transformation of the first and second faces and the first and second backgrounds. In the first stage, unless the pose similarity score $S_p(k,l)$ computed in the identify video frame step 340 is greater than 1.0 (i.e., unless the faces are looking in opposite directions), nine vectors $v_i$ that connect $p_i^{(k)}$ and $p_i^{(l)}$ are computed as $v_i=p_i^{(l)}-p_i^{(k)}$. FIG. 6 illustrates the computation of the nine vectors $v_i$ between a first face position 610 and a second face position 620.

Next, the best affine transform $A_t$ between two sets of nine points is computed using RANSAC based estimation of image transform where the first set of points is given as $\{p_i^{(k)}|1\leq i\leq 9\}$ and the second set of points is given as $\{p_i^{(k)}+(t/n)v_i|1\leq i\leq 9, 0\leq t\leq n\lambda\}$, where n controls the smoothness of the transition of the first face to the second face and $\lambda(<1)$ controls the length of the first rigid transformation during the entire transition. If $\lambda$ is 0.5, the first half of the transition is rigid transformation between the first face and the second face and the second half of the transition is non-rigid transformation between the two faces. $\lambda=0.7$ is set in a preferred embodiment of the present invention. However, this parameter can vary to produce different transition effects.

In the second stage, non-rigid transformations $R_t$ are computed between two sets of points. The first set is given as $\{p_i^{(k)}+(t/n)v_i|1\leq i\leq 9, n\lambda\leq t\leq n\}$, and the second set is given as $\{p_i^{(k)}+v_i|1\leq i\leq 9\}$.

Non-rigid transformation is computed by the regularized TPS transform. Then the image transition sequence $I_t$ is generated by transforming the first face and the first background using $A_t$ and $R_t$ while t varies from 0 to n. Formally, the transition image sequence $I_t$ for $0\leq t\leq n$ is given as:

$$I_t = \begin{cases} (1-t/n)A_t(I_f) + (t/n)I_s; & 0 \leq t < n\lambda \\ (1-t/n)R_t(I_f) + (t/n)I_s; & t > n\lambda \end{cases} \quad (4)$$

where $I_f$ is the first image that contains the first face and $I_s$ is the second image that contains the second face. Although a linear transformation in terms of t is made in an embodiment of the present invention, one can use non-linear transformation by modifying the parameter t and the range of t accordingly.

When the pose similarity score $S_p(k,l)$ computed in the identify video frame step 340 is greater than 1.0, nine vectors $v_i$ are computed as follows:

$$\{v_i = p_{7-i}^{(l)} - p_i^{(k)}, v_j = p_{16-j}^{(l)} - p_j^{(k)} | 1 \le i \le 6, 7 \le j \le 9\} \quad (5)$$

Figure 7:
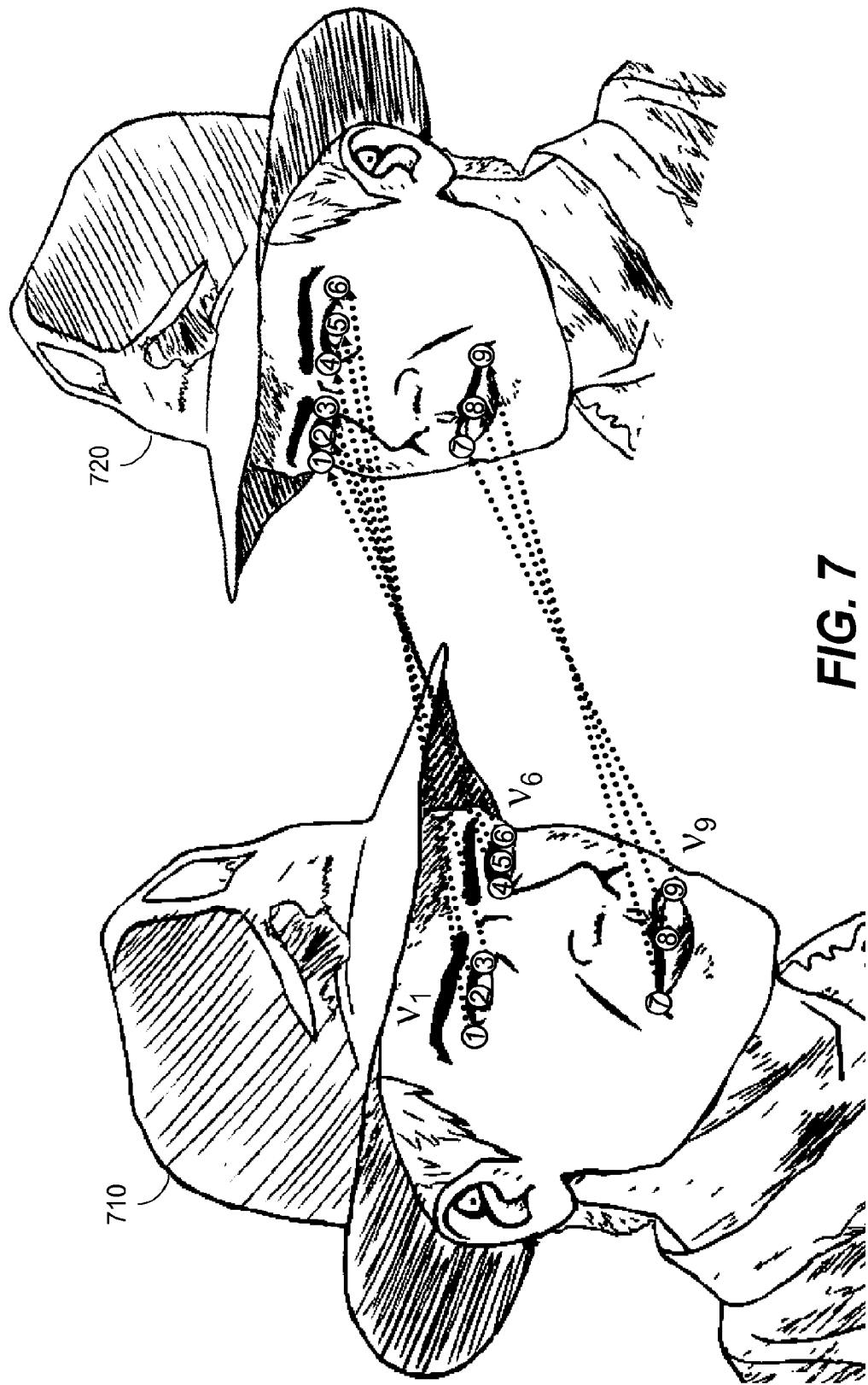
FIG. 7 is a pictorial illustration of nine vectors $v_i$ when the pose similarity score $S_p(k,l)$ is greater than 1.
Figure 8:
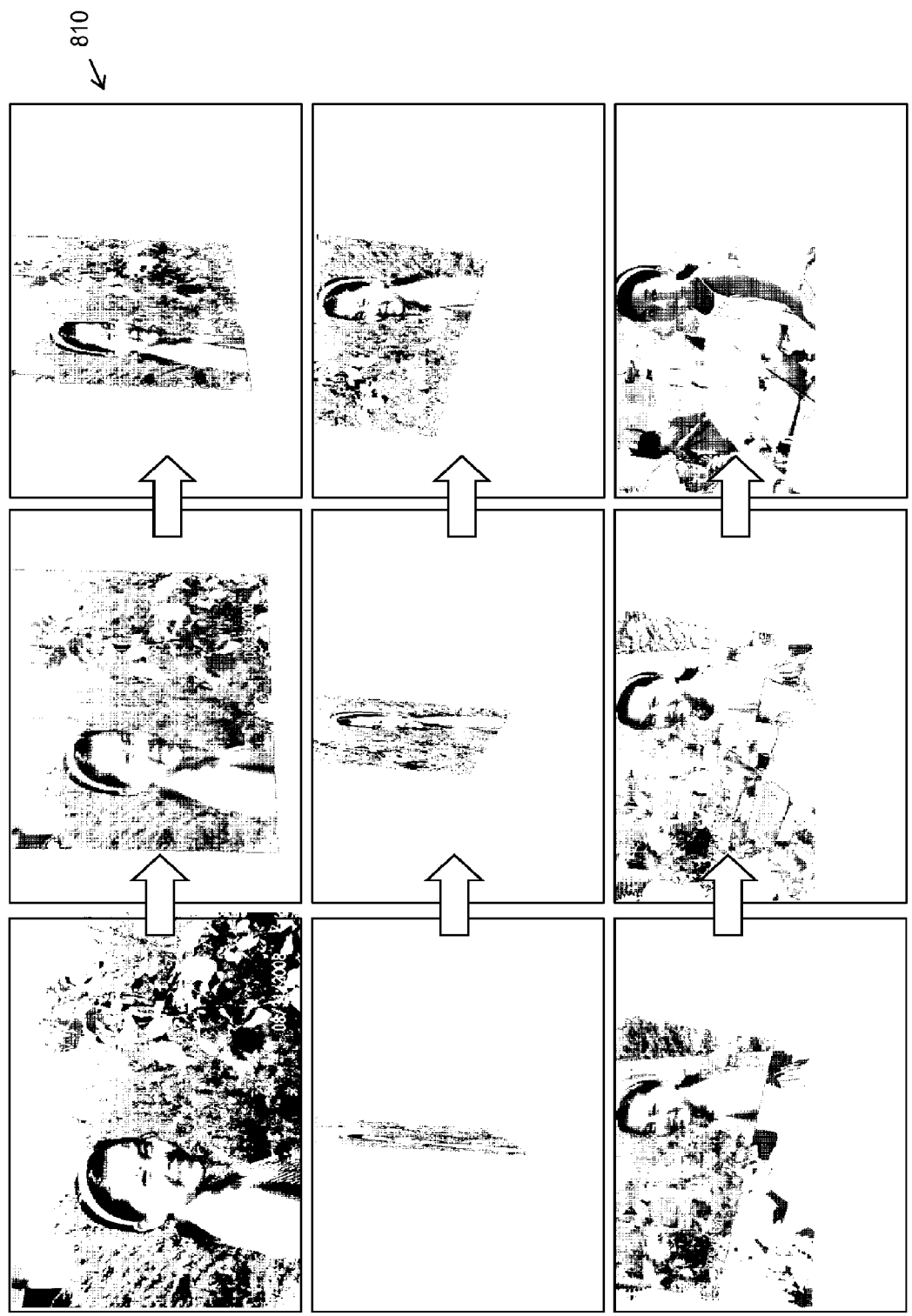
FIG. 8 is a pictorial illustration of transitioning from a first face into a second face when the pose similarity score $S_p(k,l)$ is greater than 1.

FIG. 7. Illustrates the computation of these 9 vectors between a first face position 710 and a second face position 720 when the score $S_p(k,l)$ is greater than 1.0. The rest of the procedures are identical to the case when the score $S_p(k,l)$ is not greater than 1.0. FIG. 8 illustrates a transition image sequence 810 including both rigid and non-rigid transformations corresponding to an example where the pose similarity score $S_p(k,l)$ is greater than 1.0.

The faces described in the present invention are not limited to photographed faces of humans in a photo. In some embodiments, the described transition can be performed using representations of human faces (e.g., photographed faces of statues, faces in painting, drawings, cartoons or any face-like patterns). The current state of the art is capable of detecting faces in all such cases. So for example, a photograph of a statue of George Washington can be transitioned to a video containing a live person. Furthermore, either or both of faces can be of an animal (e.g., a pet) and the transition can be between made between two animal faces, or between a human face and an animal face. For example, an image of a pet can be transitioned into a video containing its owner's face.

The present invention is described with respect to using faces to guide the transition from a still photo containing a face to a video image sequence containing a face, or vice versa. In a variation of the present invention, the described transition can be performed between a face and a non-face object, or even between two non-face objects. In such cases, an object detection method is used in place of the face detection method in order to detect the non-face objects in either a still image or the video image sequence.

The various embodiments described above are provided by way of illustration only and should not be construed to limit the invention. Those skilled in the art will readily recognize various modifications and changes that can be made to the present invention without following the example embodiments and applications illustrated and described herein, and without departing from the true spirit and scope of the present invention, which is set forth in the following claims.

PARTS LIST 100 system
110 data processing system
120 peripheral system
130 user interface system
140 processor-accessible memory system
200 source face image
210 target face image
220 intermediate face images
310 designate first face in still image step
320 designate second face in video image step
330 detect series of video frames step
340 identify video frame step
350 produce transition image sequence step
360 produce blended video sequence step
370 store blended video sequence step
410 still image
415 first face
420 video image sequence
425 second face
435 series of video frames
445 identified video frame
450 transition image sequence
452 still image transition image sequence
454 morphed image sequence
465 video frames from video image sequence
510 face
610 first face position
620 second face position
710 first face position
720 second face position
810 transition image sequence

The invention claimed is:

1. A method for producing a blended video sequence that combines a still image and a video image sequence including a plurality of video frames, comprising:
designating a first face in the still image;
designating a second face in the video image sequence;
using a data processor to automatically detect a series of video frames containing the designated second face;
using a data processor to automatically identify a video frame that is suitable for transitioning from the first face into the second face;
using a data processor to automatically produce a transition image sequence in two stages, wherein the first stage involves a rigid transformation of the still image and the second stage involves a non-rigid transformation of the first and second faces;
producing the blended video sequence by concatenating a plurality of video frames formed from the still image, the transition image sequence, and a plurality of video frames from the video image sequence; and
storing the blended video sequence in a processor accessible memory.

2. The method of claim 1, wherein the suitability of a video frame for transitioning from the first face into the second face is based upon one or more criterion selected from the group consisting of face size criterion, face position criterion, face pose similarity criterion, facial image quality criterion, facial expression criterion, and facial motion criterion.

3. The method of claim 1, wherein the rigid transformation of the still image involves computing a best affine transform between a first set of points on the first face and a second set of points on the second face using Random Sample Consensus (RANSAC) based estimation.

4. The method of claim 1, wherein the non-rigid transformation of the first and second faces is computed by regularized thin-plate spline (TPS) transformation.

5. The method of claim 1, wherein the rigid transformation comprises computing a best affine transformation, and wherein the image transition sequence is generated by transforming the first face using the affine transformation and the non-rigid transformation.

6. The method of claim 5, wherein the best affine transformation is computed between a first set of points on the first face and a second set of points on the second face, and wherein the affine transformation is computed using RANSAC based estimation of the image transformation.

7. The method of claim 1 further comprising the following steps:
designating a first background region corresponding to a portion of the still image excluding the first face;

after identifying the video frame, designating a second background region corresponding to a portion of the identified video excluding the second face;

wherein the step of using a data processor to automatically produce a transition image sequence further comprises transitioning the first background into the second background.

8. The method of claim 1, wherein at least one of the first face or the second face is automatically designated using a face detection algorithm.

9. The method of claim 1, wherein at least one of the first face or the second face is manually user designated using a user interface.

10. The method of claim 1, wherein the step of using a data processor to automatically detect a series of video frames containing the designated second face comprises locating the second face in one video frame of the video image sequence and using a face tracking algorithm to track the second face in the video image sequence.

11. A method for producing a blended video sequence that combines a still image and a video image sequence including a plurality of video frames, comprising:

designating a first face in the still image, wherein the first face, wherein the first face is a type selected from the group consisting of human face, representation of a human face, and animal face;

designating a second face in the video image sequence, wherein the second face is a type selected from the group consisting of human face, representation of a human face, and animal face;

using a data processor to automatically detect a series of video frames containing the designated second face;

using a data processor to automatically identify a video frame that is suitable for transitioning from the first face into the second face;

using a data processor to automatically produce a transition image sequence where the first face transitions into the second face;

producing the blended video sequence by concatenating a plurality of video frames formed from the still image, the transition image sequence, and a plurality of video frames from the video image sequence; and storing the blended video sequence in a processor accessible memory.

12. The method of claim 11, wherein human faces are automatically designated using a face detection algorithm and representations of human faces are automatically designated using an object detection method.

\* \* \* \* \*